United States Patent [19]
Ishikawa et al.

[11] Patent Number: 6,128,105
[45] Date of Patent: Oct. 3, 2000

[54] IMAGE READING UNIT AND INFORMATION PROCESSING APPARATUS

[75] Inventors: Yoshihiro Ishikawa; Yasunori Nishijima, both of Asaka, Japan

[73] Assignee: Fuji Photo Film Co., Ltd., Kanagawa, Japan

[21] Appl. No.: 09/100,961

[22] Filed: Jun. 22, 1998

[30] Foreign Application Priority Data

Jun. 23, 1997 [JP] Japan ................................... 9-166325

[51] Int. Cl.⁷ .................................................. H04N 1/04
[52] U.S. Cl. ........................ 358/483; 358/496; 358/474
[58] Field of Search .................................. 358/483, 482, 358/496, 474, 471, 498, 505, 475; 399/211, 380; 250/208.1; 382/312

[56] References Cited

U.S. PATENT DOCUMENTS 5,489,992  2/1996  Endo ........................................ 358/482

*Primary Examiner*—Cheukfan Lee
*Attorney, Agent, or Firm*—Sughrue, Mion, Zinn, Macpeak & Seas, PLLC

[57] ABSTRACT

A sheet with a thickness $\Delta x$ is attached on a surface of a plate glass in an image reading area, against which a subject-sheet is pressed, so that an air layer of thickness $\Delta x$ can be formed between the surface of the plate glass and a surface of the subject-sheet at the opposite side. The thickness $\Delta x$ is determined to reduce the effects of an optical interference of the illumination light from a light emitting diode. The sheet has an uneven surface in order to decrease an area where the sheet is in contact with the subject-sheet, thus reducing the adhesion between the sheet and the subject-sheet. A member with a low coefficient of friction is used as the sheet.

22 Claims, 11 Drawing Sheets

IMAGE READING UNIT AND INFORMATION PROCESSING APPARATUS

BACKGROUND OF THE INVENTION

1. Field of the Invention

The present invention relates generally to an image reading unit and an information processing apparatus, and more particularly to an image reading unit suitable for reading a photograph printed on printing paper, and an information processing apparatus such as a scanner, a facsimile machine, a copying machine and a printer that include the image reading unit.

2. Description of Related Art

A conventional image reading unit shown in FIG. 14 has a casing 10, which extends in a direction perpendicular to paper, and the casing 10 contains a line sensor 12, a SELFOC® lens 14, red, green and blue light emitting diodes (LED) 16, and a light transmission tube 18. A plate glass 20 closes the casing 10.

A scanner using the above-mentioned image reading unit is provided with a transport roller (not shown) that presses a subject-sheet 1 tightly between itself and the plate glass 20. The rotation of the transport roller transports the subject-sheet 1 on the surface of the plate glass 20.

The LEDs 16 emit red, green and blue illumination light sequentially, and the illumination light is transmitted to a predetermined image reading area of the image reading unit through the light transmission tube 18 and the plate glass 20. The illumination light falls on the subject-sheet 1, and the light that is reflected by the subject-sheet 1 in the image reading area is formed on a light receiving surface of the line sensor 12 through the SELFOC® lens 14. The line sensor 12 converts the formed image into line-sequential signals of the three colors: red, green and blue.

The scanner including the conventional image reading unit has a disadvantage of poor transportability of the subject-sheet that has a smooth surface, since the adhesion of the surface of the subject-sheet to the surface of the plate glass, which operates as a subject-sheet receiving face of the image reading unit. If the subject-sheet is the photograph printed on printing paper in particular, a gelatinous layer on the surface of the photograph absorbs moisture under the high humidity and temperatures and raises the adhesion of the subject-sheet to the plate glass.

Moreover, the conventional image reading unit has a shortcoming in that optical interference, which makes noise in the read image, occurs between a light reflected on the glass surface and a light reflected on the subject-sheet surface, since the subject-sheet surface is in contact with or extremely close to the plate glass surface in the image reading area.

SUMMARY OF THE INVENTION

An object of the present invention is to provide an image reading unit and an information processing apparatus that reduce the effects of the optical interference.

Another object of the present invention is to provide an image reading unit and an information processing apparatus that improve the transportability of the subject-sheet to prevent the poor transport.

To achieve the above-mentioned object, the present invention is directed to an image reading unit comprising: a guide member having a subject-sheet receiving surface coming into contact with a subject-sheet, the guide member transmitting light at least in an image reading area and an area for illuminating an image on a subject-sheet surface; a light emission part for illuminating the subject-sheet surface on the guide member through the guide member; a photo-electric converter for converting the image on the subject-sheet surface, located in the image reading area on the guide member, into an image signal; and wherein the guide member is provided with one of a step and a concave such that a predetermined air layer is formed to reduce effects, on image reading, of optical interference produced between a reflected light that is emitted from the light emission part and is reflected on a boundary between the guide member and the air, and a reflected light that is emitted from the light emission part and is reflected on the surface of the subject-sheet. To form one of the step and the concave, a sheet is attached on the surface of the guide member. A thickness of the predetermined air layer is $\Delta x$ satisfying the following inequality:

$$4\lambda < \Delta x,$$

where $\lambda$ is a wavelength of a light for reading the image on the subject-sheet surface with use of the light emission part. The interference is reduced with the increase in $\Delta x$. If $\lambda$ is within or around visible spectrum, it is known from experience that it becomes impossible to find the interference when the thickness $\Delta x$ is more than $4\lambda$.

To achieve the above-mentioned object, the present invention is directed to an image reading unit comprising: a guide member having a subject-sheet receiving surface coming into contact with a subject-sheet, the guide member transmitting light at least in an image reading area and an area for illuminating an image on a subject-sheet surface; a light emission part for illuminating the subject-sheet surface on the guide member through the guide member; a photo-electric converter for converting the image on the subject-sheet surface, located in the image reading area on the guide member, into an image signal; and wherein the guide member is constructed in such a manner as to decrease an area where the subject-sheet receiving surface of the guide member comes into contact with the subject-sheet to thereby reduce adhesion between the guide member and the subject-sheet. The area where the subject-sheet receiving surface of the guide member comes into contact with the subject-sheet affects the adhesion between the guide member and the subject-sheet. Then, to reduce the adhesion, a sheet with an uneven surface is attached on the guide member, or at least the subject-sheet receiving surface of the guide member is machined to be uneven, for example. Moreover, a member with a low coefficient of friction composes at least the subject-sheet receiving surface of the guide member, and thereby, the transportability of the subject-sheet is improved.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
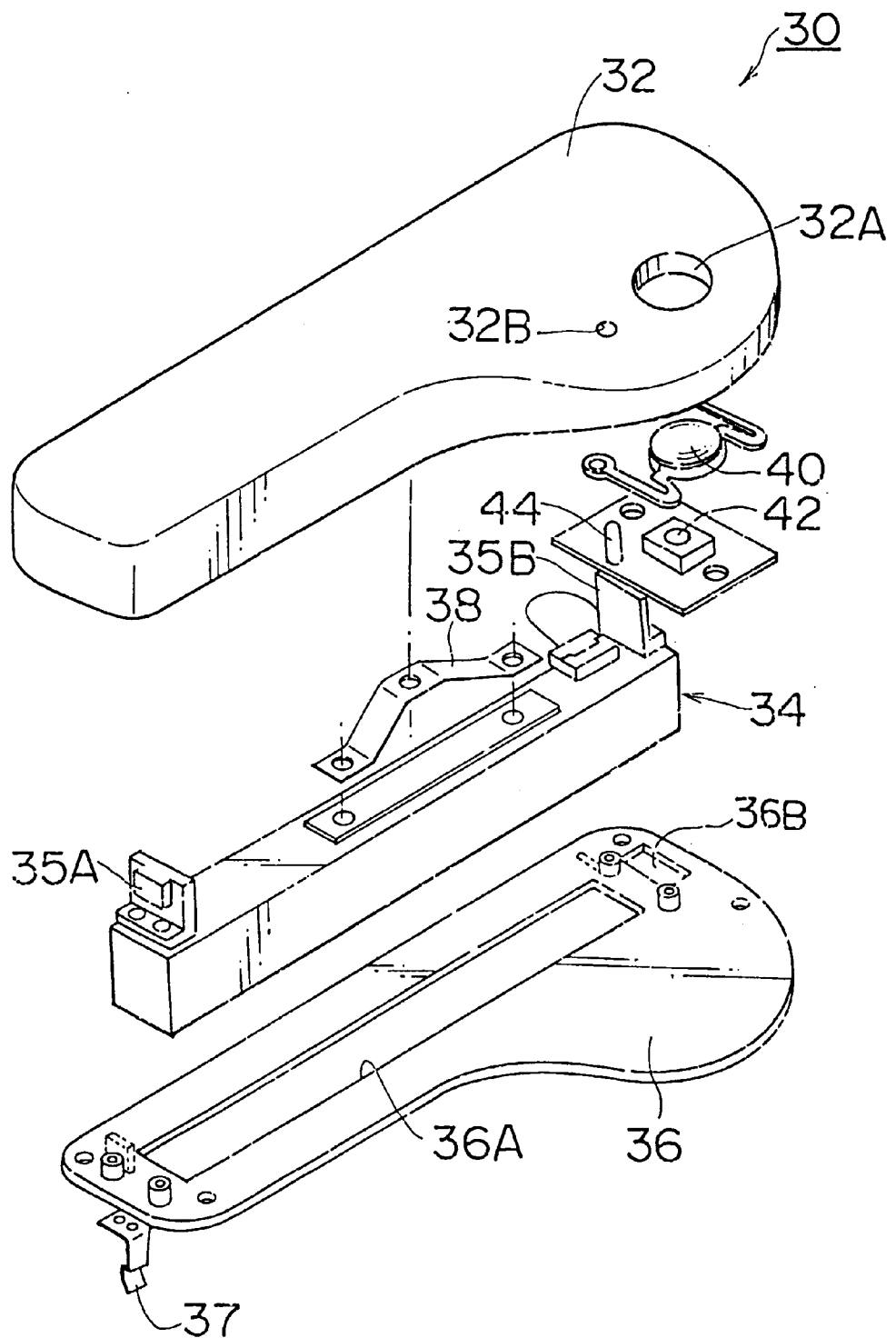
FIG. 1 is an exploded perspective view illustrating a reading part of a scanner that includes an image reading unit according to the present invention.
Figure 2:
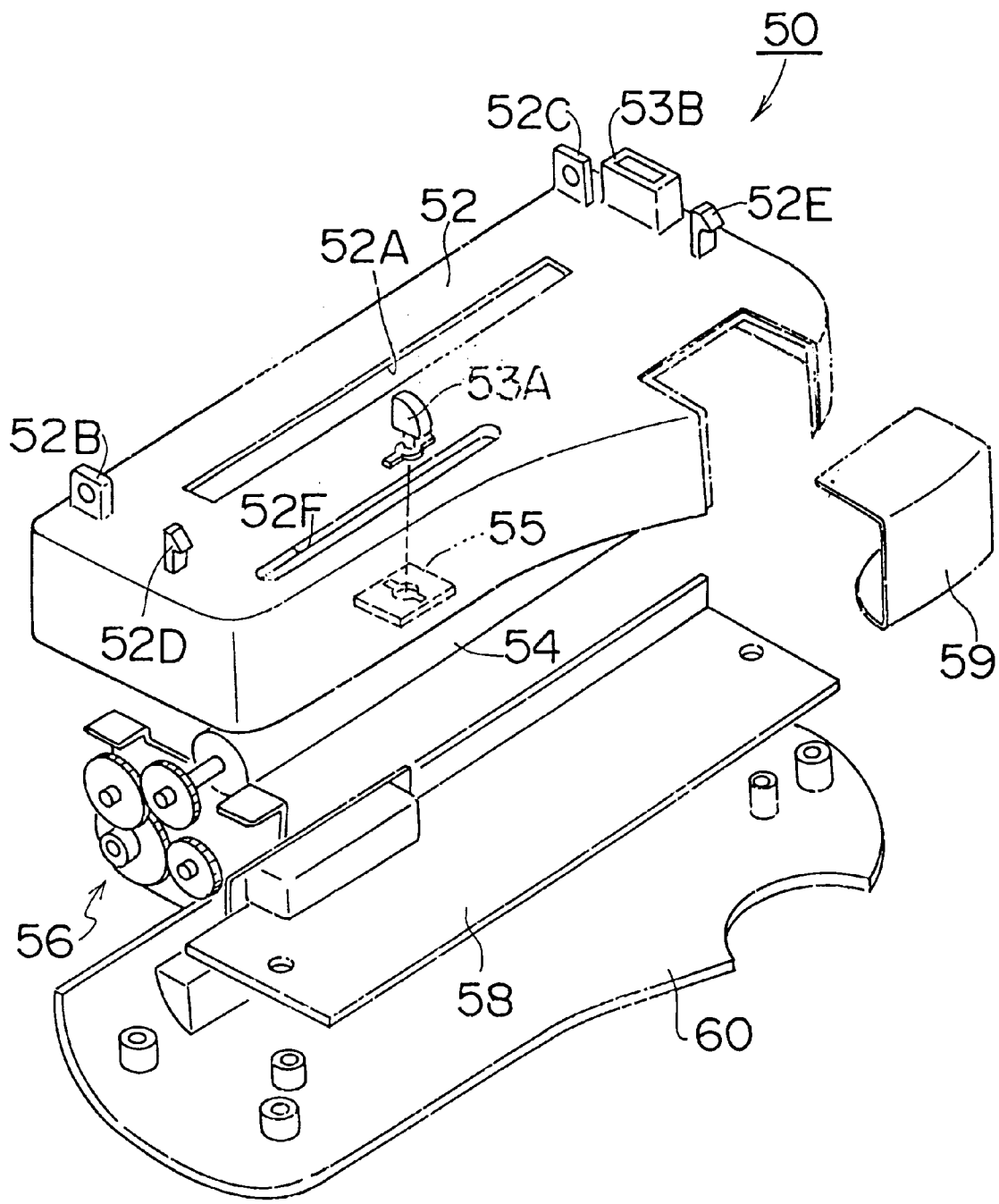
FIG. 2 is an exploded perspective view illustrating a transport part of the scanner.

FIG. 1 is an exploded perspective view illustrating a reading part of a scanner that includes an image reading unit according to the present invention, and FIG. 2 is an exploded perspective view illustrating a transport part of the scanner.

As shown in FIG. 1, the reading part 30 of the scanner comprises a top cover 32, an image reading unit 34, and a bottom cover 36. The image reading unit 34 is inserted in an opening 36A of the bottom cover 36, and holders 35A, 35B provided at both ends of the image reading unit 34 are guided in guide parts (not shown) of the top cover 32. Thus, the image reading unit 34 is arranged between the top cover 32 and the bottom cover 36 in a manner to slide vertically in FIG. 1. A leaf spring 38 is arranged between the image reading unit 34 and the top cover 32, and the image reading unit 34 is partially protruded from the opening 36A elastically by the leaf spring 38.

In FIG. 1, reference numeral 40 is a key top of a start switch 42, which instructs the image reading unit 34 to start reading a subject-sheet, and the key top 40 faces an opening 32A of the top cover 32. Reference numeral 44 is an LED showing the working state of the image reading unit 34, and the LED 44 faces an opening 32B of the top cover 32.

On the other hand, as shown in FIG. 2, a transport part 50 of the scanner comprises a top cover 52, a transport roller 54, a mechanical block 56, a main circuit board 58, and a bottom cover 60.

The top cover 52 is provided with an opening 52A which the transport roller 54 faces, a slide guide 53A which guides the left end of the subject-sheet, a fixed guide 53B which guides the right end of the subject-sheet, supporting parts 52B & 52C which rotatably support the reading part 30 in FIG. 1, and hooks 52D & 52E which are coupled to two clips 37 (only one of the clips is shown in FIG. 1) of the reading part 30. The slide guide 53A is coupled to a stopper 55 through a slit 52F which is formed in the top cover 52, and the slide guide 53A is manually moved in conformity to the size of the subject-sheet. The opening 36B of the bottom cover 36 of the reading part 30 is coupled to the fixed guide 53B of the transport part 50. The reading part 30 and the transport part 50 are wired through the opening 36B and the inside of the fixed guide 53B.

Figure 3:
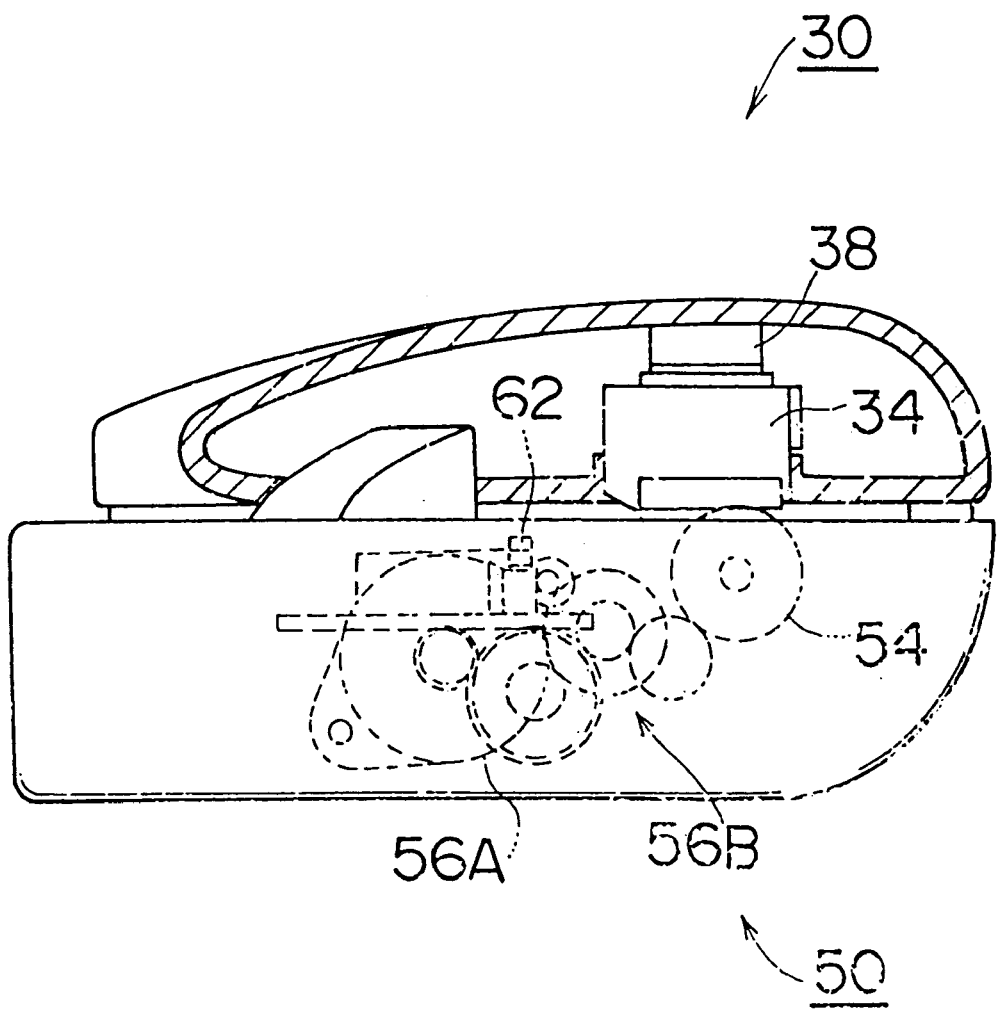
FIG. 3 is a side view of the scanner, including a partial section thereof.
Figure 4:
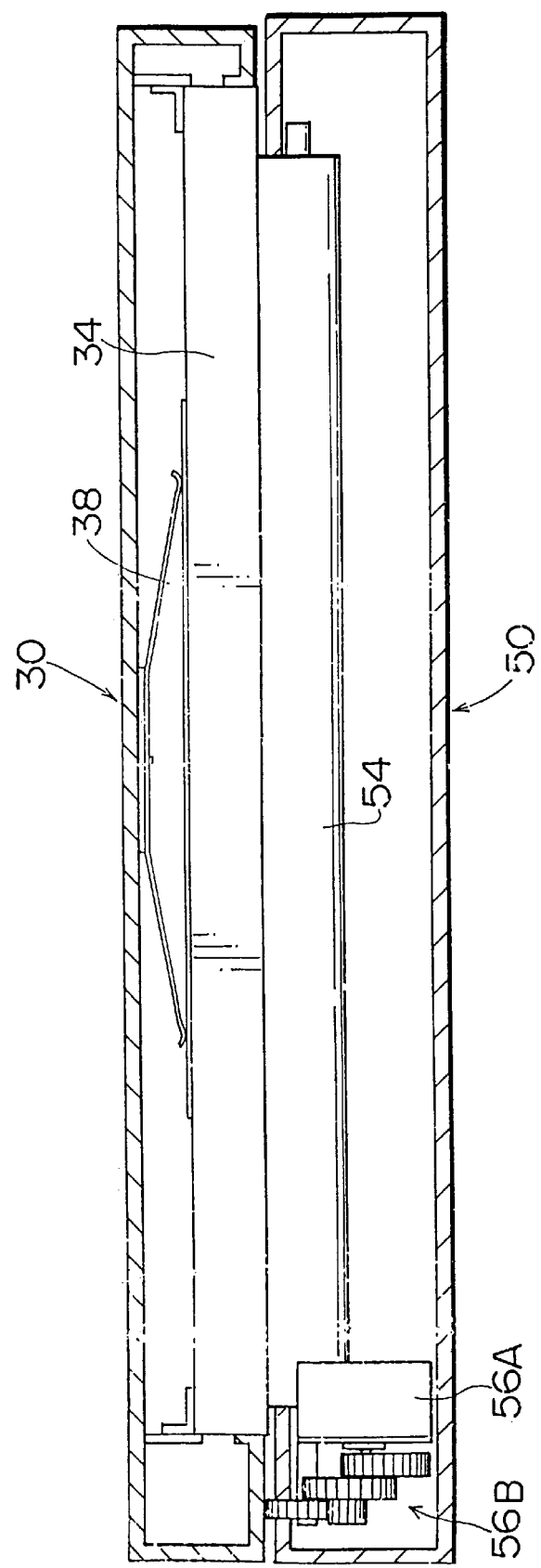
FIG. 4 is a front view of the scanner, including a partial section thereof.

FIGS. 3 and 4 are a side view and a front view, respectively, including a partial section of the scanner. As shown in FIGS. 3 and 4, the mechanical block 56 comprises a stepping motor 56A, and a reduction gear train 56B that transmits a rotation driving force of the stepping motor 56A to the transport roller 54. The image reading unit 34 of the reading part 30 is forced to the transport roller 54 of the transport part 50 by the leaf spring 38. In FIG. 3, reference numeral 62 is a subject-sheet presence detection sensor.

When a subject-sheet is inserted into a gap between the reading part 30 and the transport part 50, the subject-sheet presence detection sensor 62 detects the presence of the subject-sheet, and the key top 40 in FIG. 1 is pressed to turn on the start switch 42, the transport roller 54 is rotated and the image reading unit 34 starts reading the subject-sheet. If a preset time has passed since the subject-sheet presence detection sensor 62 detects the absence of the subject-sheet, then the transport roller 54 stops and the image reading unit 34 finishes reading the subject-sheet.

Figure 5:
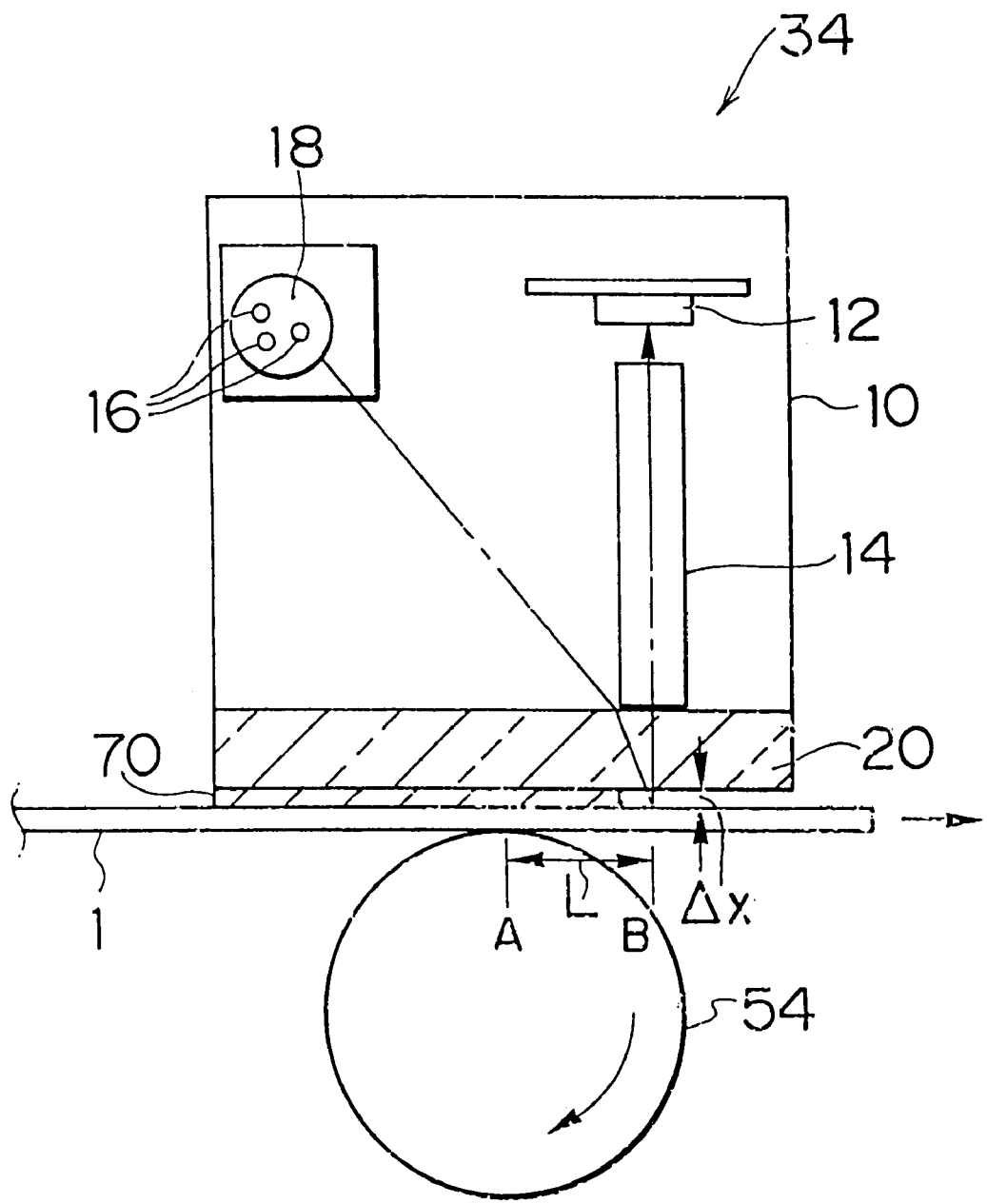
FIG. 5 is an enlarged view illustrating the essential parts of the first embodiment of the scanner.

FIG. 5 is an enlarged view illustrating the essential parts of the scanner according to the first embodiment according to the present invention.

As shown in FIG. 5, the image reading unit 34 has a casing 10 that contains a line sensor 12, a SELFOC® lens 14, red, green and blue LEDs 16, and a light transmission tube 18. A plate glass 20 closes the casing 10, and a sheet 70 is attached on the surface of the plate glass 20.

Figure 14:
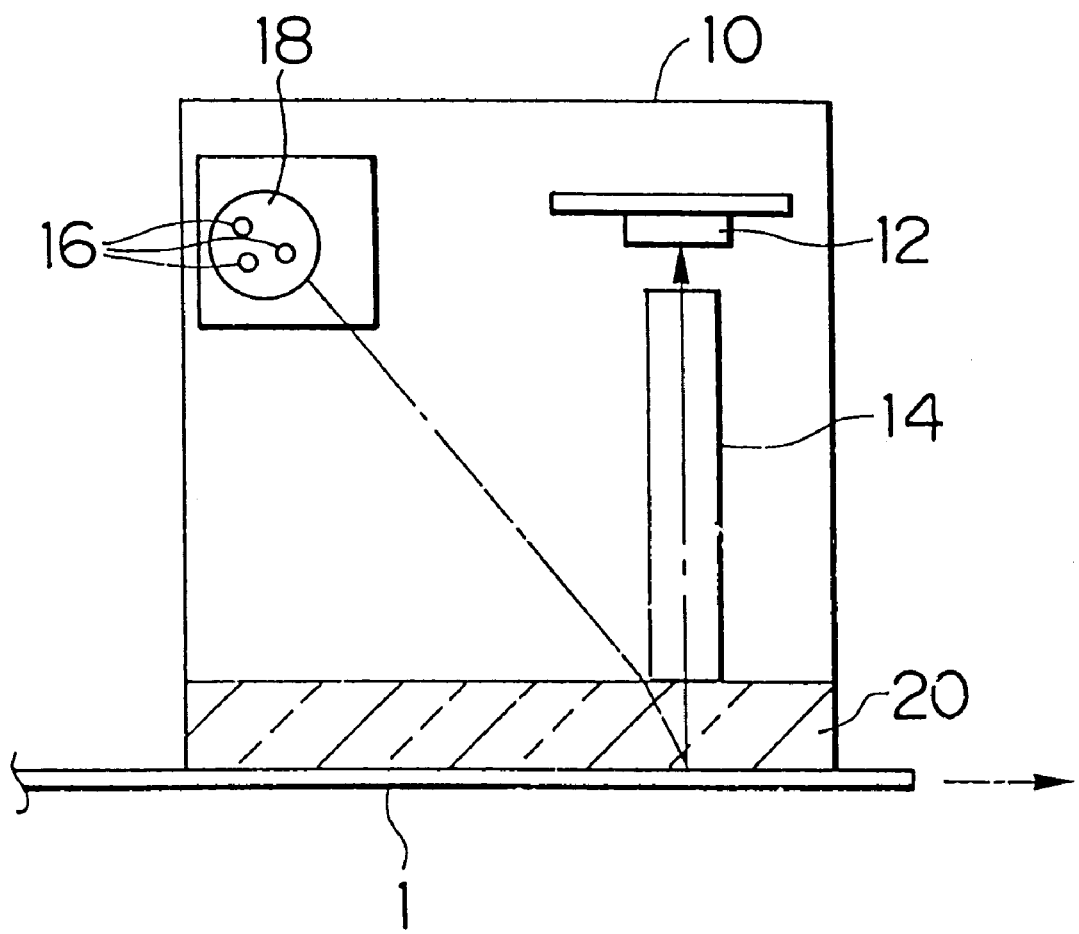
FIG. 14 is a side view illustrating the structure of a conventional image reading unit.

In other words, the image reading unit 34 is different from the conventional image reading unit in FIG. 14 mainly in that the sheet 70 is attached.

The sheet 70 is attached on the surface of the plate glass 20 in such a manner as to include at least a position A which receives the pressure of the transport roller 54 and not to include an image reading area B of the image reading unit 34. Accordingly, an air layer with thickness $\Delta x$ equal to that of the sheet 70 is formed between the glass surface and the subject-sheet surface. The distance between the image reading area B and the position A which receives the pressure of the transport roller 54 is between about 1 mm and about 2 mm for example.

A description will be given of a reason for forming the air layer with the thickness $\Delta x$.

Figure 6:
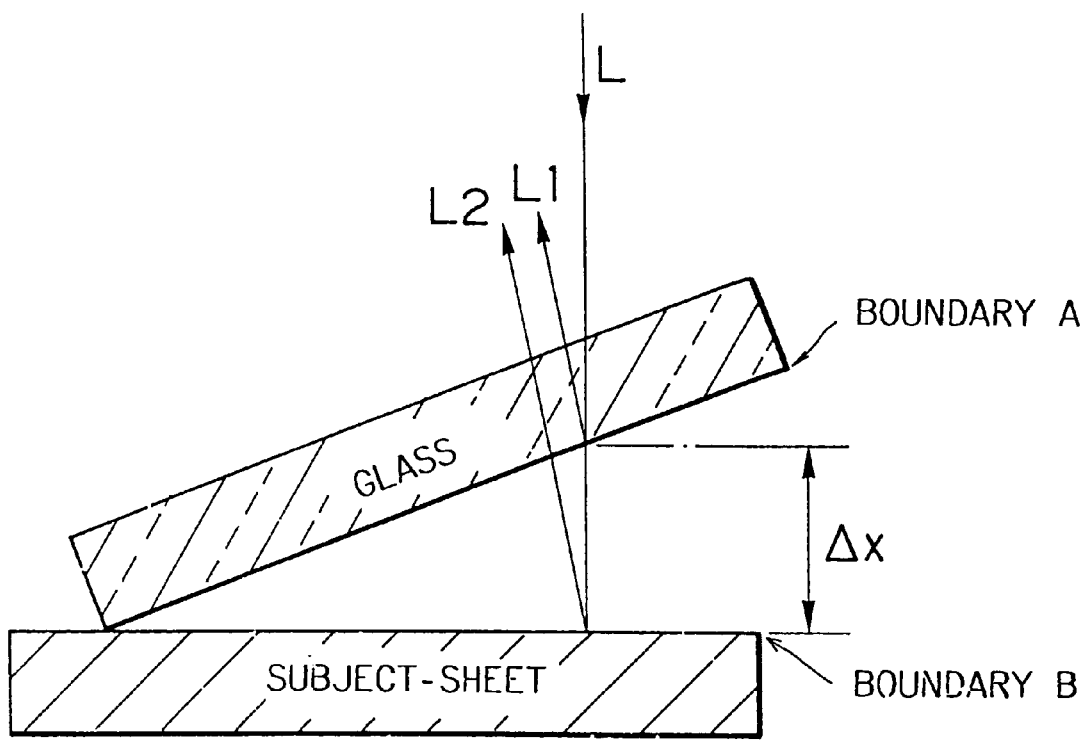
FIG. 6 is a view for assistance in explaining the optical interference.

In FIG. 6, an illumination light is L, the light reflected on the glass surface (a boundary A) is L1, and the light reflected on the subject-sheet surface (a boundary B) is L2. The light does not change its phase on the occasion of the reflection on the boundary A, and the light inverts its phase on the occasion of the reflection on the boundary B (the phase is displaced by half wavelength). Hence, the reflected lights L1 & L2 interfere with one another, and dark parts appear in states that are given by:

$$2\Delta x = n\lambda \ (n=0,1,2,\ldots), \tag{1}$$

where $\lambda$ is the wavelength of the illumination light.

Even if $\Delta x$ is 0, the light L2 reflected on the boundary B inverts its phase compared with the light L1 reflected on the boundary A, and a dark part appears (n=0).

Since the light L2 reflected on the boundary B diffuses, the interference is reduced with the increase in $\Delta x$, and it is known from experience that it becomes impossible to find the interference when n is about 8.

Hence, for avoiding the optical interference, $\Delta x$ must be larger than $4\lambda$ that is obtained by substituting 8 for n in the equation (1). In other words, for avoiding the interference, $\Delta x$ must satisfy the following inequality:

$$4\lambda < \Delta x. \quad (2)$$

Figure 7:
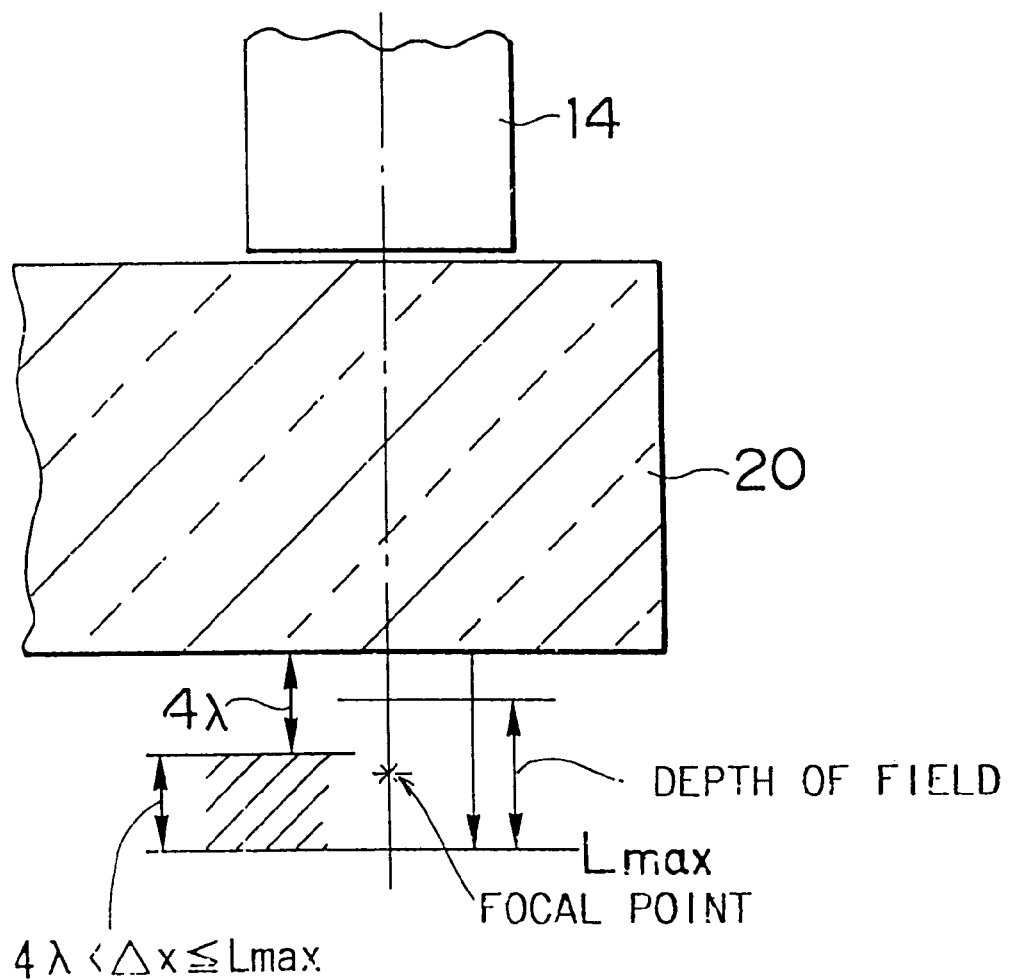
FIG. 7 is an enlarged view illustrating the image reading area of the scanner.

On the other hand, the subject-sheet surface, which is apart from the surface of the plate glass 20 by $\Delta x$, must be positioned within the depth of field as shown in FIG. 7 for satisfactory resolution. Hence, $\Delta x$ must satisfy the following inequality:

$$4\lambda < \Delta x \leq L_{max}, \quad (3)$$

where $L_{max}$ is the distance between the surface of the plate glass 20 and the far point of the depth of field.

For the reasons stated above, the thickness $\Delta x$ of the sheet 70 in FIG. 5 is determined so as to satisfy the inequality (3). Since the red, green and blue LEDs 16 are used for the light source for illumination in this embodiment, the wavelength of the red light, which is the longest in the three colors, is substituted for $\lambda$ in the inequality (3).

The sheet 70 is crimped or embossed in order to reduce an area where the sheet 70 is in contact with the subject-sheet. This reduces the adhesion of the subject-sheet to thereby improve the transportability. Moreover, the sheet 70 is preferably made of material with a low coefficient of friction (e.g. PET (polyethyleneterephthalate), PVC (polyvinylchloride), and Teflon® (polytetrafluoroethylene)) so as to improve the transportability.

The plate glass 20, on which the sheet 70 is attached, operates as a guide member that regulates the position of the subject-sheet surface in the image reading unit, which has a small depth of field. An optical filter that selectively diminishes the intensity of light of certain wavelength (an invisible light, e.g. an infrared light) is provided in at least one of an area of the plate glass 20 for illuminating an image on the subject-sheet surface and the image reading area of the plate glass 20. An antireflection coating is formed at least in the image reading area of the plate glass 20.

FIGS. 8–13 are side views illustrating the essential parts of other embodiments (from the second to the seventh embodiment) of the scanner that includes the image reading unit according to the present invention. Parts similar to those described with reference to FIG. 5 are denoted by the same reference numerals, and they will not be explained.

Figure 8:
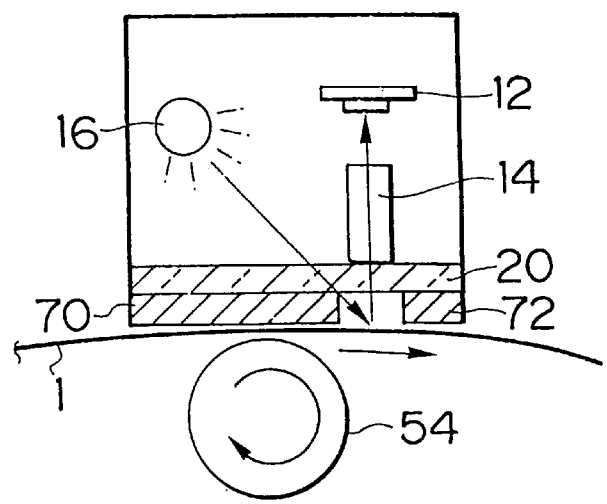
FIG. 8 is a side view illustrating the essential parts of the second embodiment according to the present invention.

The second embodiment in FIG. 8 is different from the first embodiment in FIG. 5 in that a sheet 72, as well as the sheet 70, is attached on the glass surface at the feeding side of the image reading area. This stabilizes the position of the subject-sheet surface in the image reading area. The thickness of the sheet 72 is determined so as to satisfy the previously-mentioned inequality (3).

Figure 9:
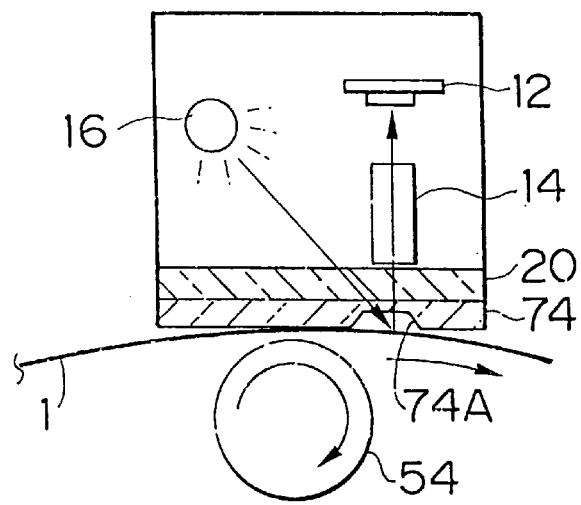
FIG. 9 is a side view illustrating the essential parts of the third embodiment according to the present invention.

According to the third embodiment in FIG. 9, a sheet 74 is attached on the surface of the plate glass 20. The sheet 74 transmits a sufficient quantity of light of a wavelength used for scanning, and has a concave part 74A in the image reading area thereof. The depth of the concave part 74A on the sheet 74 satisfies $\Delta x$ in the above inequality (3).

Figure 10:
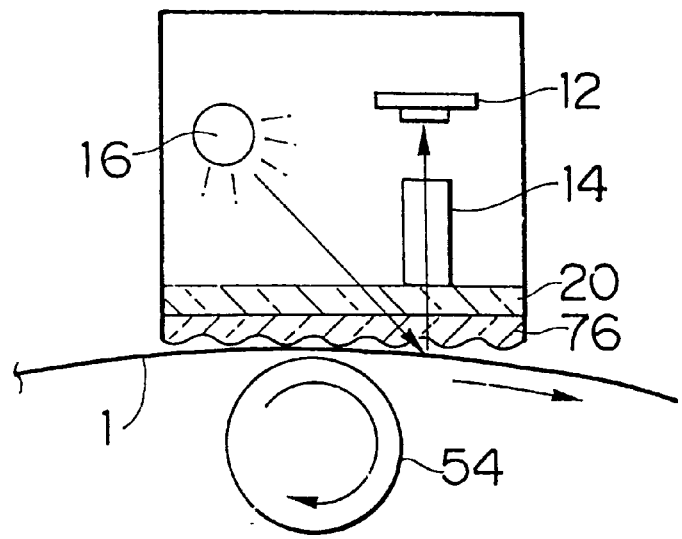
FIG. 10 is a side view illustrating the essential parts of the fourth embodiment according to the present invention.

According to the fourth embodiment in FIG. 10, a sheet 76 is attached on the surface of the plate glass 20. The sheet 76 transmits a sufficient quantity of light of a wavelength used for scanning, and the surface of the sheet 76 is processed to become uneven. The depth of the unevenness on the sheet 76 satisfies $\Delta x$ in the above inequality (3), and the pitch of the unevenness is smaller than that of the sensors on the line sensor 12.

Figure 11:
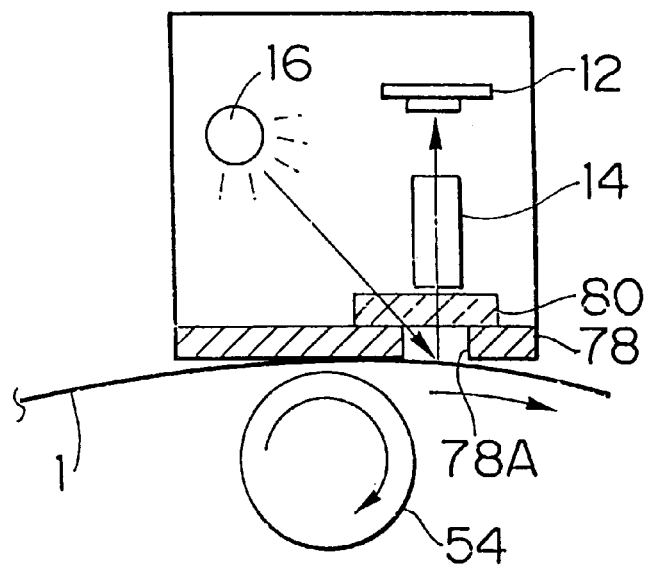
FIG. 11 is a side view illustrating the essential parts of the fifth embodiment according to the present invention.

According to the fifth embodiment in FIG. 11, the subject-sheet 1 is pressed against a guide member 78 with an opening 78A including the illumination position and the image reading area, and an optical member (e.g. a plate glass) 80 is provided in such a manner as to close the opening 78A. The width of the opening 78A is determined so as to illuminate the image reading area sufficiently (0.1 mm for example).

The guide member 78 is embossed, matted, or the like so as to reduce the area in contact with the subject-sheet 1, and the guide member 78 is composed of a member (either transparent or opaque) with a low coefficient of friction. The distance between a subject-sheet receiving surface of the guide member 78 and the outer surface of the optical member 80 satisfies $\Delta x$ in the above inequality (3).

Figure 12:
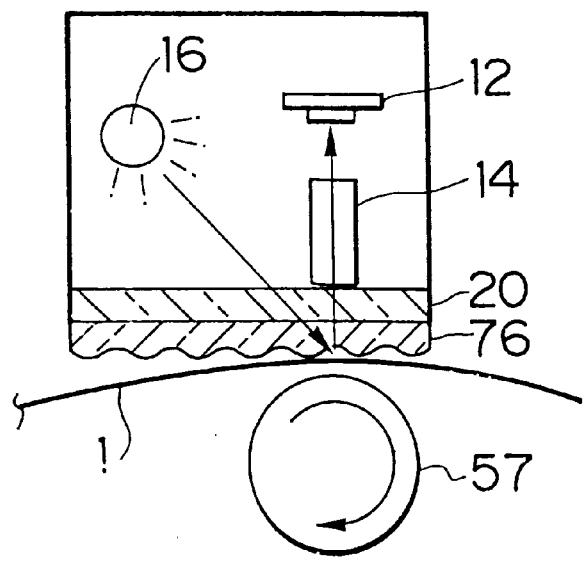
FIG. 12 is a side view illustrating the essential parts of the sixth embodiment according to the present invention.

The sixth embodiment in FIG. 12 is different from the fourth embodiment in FIG. 10 only in the position of a transport roller 57. The transport roller 57 in FIG. 12 is not offset from the image reading area, whereas the transport roller 54 in FIG. 10 is offset from the image reading area. The position where the transport roller 57 comes into contact with the subject-sheet 1 corresponds to the image reading area. This stabilizes the position of the subject-sheet surface in the image reading area.

Figure 13:
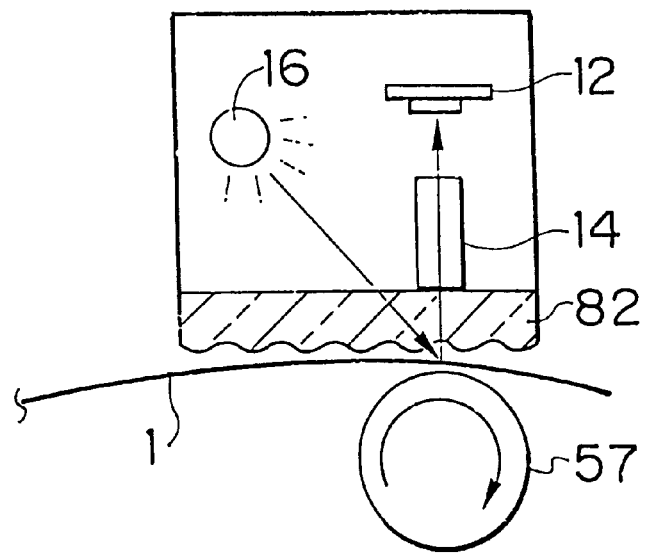
FIG. 13 is a side view illustrating the essential parts of the seventh embodiment according to the present invention.

According to the seventh embodiment in FIG. 13, a plate glass 82 has an uneven subject-sheet receiving surface in contact with the subject-sheet 1. The unevenness is formed by surface machining such as polishing, coating, or chemical treatment. The depth and pitch of the unevenness are equivalent to those of the unevenness formed on the sheet 76 in FIG. 10. As is the case with the transport roller 57 in FIG. 12, the transport roller 57 in FIG. 13 is not offset.

The present invention may be applied not only to the apparatus that transports the subject-sheet with use of the transport roller, but to an apparatus that fixes the subject-sheet and moves the image reading unit during scanning.

As set forth hereinabove, according to the present invention, there is formed the step or concave on the guide member of the image reading unit that comes into contact with the subject-sheet to guide the subject-sheet, so that the air layer is formed between the surface of the guide member in the image reading area and the subject-sheet surface at the opposite side. This reduces the effects of the optical interference due to the illumination light, so that the subject-sheet can be read satisfactorily.

Furthermore, according to the present invention, the guide member is constructed in such a manner as to reduce the area where the subject-sheet receiving surface of the guide member comes into contact with the subject-sheet. This reduces the adhesion of the guide member and the subject-sheet, and hence the subject-sheet can be transported satisfactorily. The transportability is further improved by the use of the member with a low coefficient of friction as the subject-sheet receiving surface.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image reading unit comprising:
   a guide member having a subject-sheet receiving surface which comes into contact with a subject-sheet, said guide member transmitting light at least in an image reading area and an area for illuminating an image on a subject-sheet surface;
   a light emission part which illuminates the subject-sheet surface on said guide member through said guide member; and a photoelectric converter which converts the image on the subject-sheet surface, located in the image reading area on said guide member, into an image signal;

wherein said guide member is provided with one of a step and a concave such that an air layer having a predetermined thickness is formed to reduce effects, on image reading, of an optical interference produced between a reflected light that is emitted from said light emission part and is reflected on a boundary between said guide member and the air, and a reflected light that is emitted from said light emission part and is reflected on the surface of the subject-sheet; and wherein the predetermined thickness of the air layer is Δx satisfying the following inequality:

$$4\lambda < \Delta x,$$

where λ is a wavelength of a light for reading the image on the subject-sheet surface with use of said light emission part.

2. The image reading unit as defined in claim 1, wherein a sheet is attached on the surface of said guide member to form one of said step and said concave.

3. The image reading unit as defined in claim 1, wherein there is provided an optical filter that selectively diminishes an intensity of a light of predetermined wavelength in at least one of the following two areas on said guide member: the area for illuminating the image on the subject-sheet surface and the image reading area.

4. The image reading unit as defined in claim 1, wherein an antireflection coating is formed at least in the image reading area on said guide member.

5. An image reading unit comprising:
a guide member having a subject-sheet receiving surface which comes into contact with a subject-sheet, said guide member transmitting light at least in an image reading area and an area for illuminating an image on a subject-sheet surface;
a light emission part which illuminates the subject-sheet surface on said guide member through said guide member; and
a photoelectric converter which converts the image on the subject-sheet surface, located in the image reading area on said guide member, into an image signal; and
wherein said guide member is constructed to decrease an area where the subject-sheet receiving surface of said guide member contacts the subject-sheet to thereby reduce adhesion between said guide member and the subject-sheet.

6. The image reading unit as defined in claim 5, wherein at least the subject-sheet receiving surface of said guide member is machined to be uneven.

7. The image reading unit as defined in claim 5, wherein a member with a coefficient of friction which is lower than a surface of a flat glass plate composes at least the subject-sheet receiving surface of said guide member.

8. The image reading unit as defined in claim 5, further comprising an optical filter which selectively diminishes an intensity of light of a predetermined wavelength in at least one of the following two areas on said guide member: the area for illuminating the image on the subject-sheet surface and the image reading area.

9. The image reading unit as defined in claim 5, wherein an antireflection coating is formed at least in the image reading area on said guide member.

10. An image reading unit comprising:
a guide member having a subject-sheet receiving surface which comes into contact with a subject-sheet, said guide member transmitting light at least in an image reading area and an area for illuminating an image on a subject-sheet surface;
a light emission part which illuminates the subject-sheet surface on said guide member through said guide member; and
a photoelectric converter which converts the image on the subject-sheet surface, located in the image reading area on said guide member, into an image signal; and
wherein said guide member is constructed to decrease an area where the subject-sheet receiving surface of said guide member contacts the subject-sheet to thereby reduce adhesion between said guide member and the subject-sheet,
wherein a sheet with an uneven surface is attached on said guide member, and the surface of said sheet serves as the subject-sheet receiving surface.

11. An image reading unit comprising:
a guide member having a subject-sheet receiving surface which comes into contact with a subject-sheet, said guide member transmitting light at least in an image reading area and an area for illuminating an image on a subject-sheet surface;
a light emission part which illuminates the subject-sheet surface on said guide member through said guide member; and
a photoelectric converter which converts the image on the subject-sheet surface, located in the image reading area on said guide member, into an image signal; and
wherein said guide member is constructed to decrease an area where the subject-sheet receiving surface of said guide member contacts the subject-sheet to thereby reduce adhesion between said guide member and the subject-sheet,
wherein a member whose surface is uneven is combined with said guide member, and the surface of said member serves as the subject-sheet receiving surface.

12. An image reading unit comprising:
a guide member having a subject-sheet receiving surface which comes into contact with a subject-sheet, said guide member transmitting light at least in an image reading area and an area for illuminating an image on a subject-sheet surface;
a light emission part which illuminates the subject-sheet surface on said guide member through said guide member; and
a photoelectric converter which converts the image on the subject-sheet surface, located in the image reading area on said guide member, into an image signal;
wherein said guide member is provided with one of a step and a concave such that an air layer having a predetermined thickness is formed to reduce effects, on image reading, of an optical interference produced between a reflected light that is emitted from said light emission part and is reflected on a boundary between said guide member and the air, and a reflected light that is emitted from said light emission part and is reflected on the surface of the subject-sheet; and
wherein said guide member is constructed to decrease an area where the subject-sheet receiving surface of said guide member contacts the subject-sheet to thereby reduce adhesion between said guide member and the subject-sheet.

13. The image reading unit as defined in claim 12, wherein at least the subject-sheet receiving surface of said guide member is machined to be uneven.

14. The image reading unit as defined in claim 12, wherein a member with a coefficient of friction which is lower than a surface of a flat glass plate composes at least the subject-sheet receiving surface of said guide member.

15. The image reading unit as defined in claim 12, further comprising an optical filter which selectively diminishes an intensity of light of a predetermined wavelength in at least one of the following two areas on said guide member: the area for illuminating the image on the subject-sheet surface and the image reading area.

16. The image reading unit as defined in claim 12, wherein an antireflection coating is formed at least in the image reading area on said guide member.

17. An image reading unit comprising:

a guide member having a subject-sheet receiving surface which comes into contact with a subject-sheet, said guide member transmitting light at least in an image reading area and an area for illuminating an image on a subject-sheet surface;

a light emission part which illuminates the subject-sheet surface on said guide member through said guide member; and a photoelectric converter which converts the image on the subject-sheet surface, located in the image reading area on said guide member, into an image signal;

wherein said guide member is provided with one of a step and a concave such that a predetermined air layer is formed to reduce effects, on image reading, of an optical interference produced between a reflected light that is emitted from said light emission part and is reflected on a boundary between said guide member and the air, and a reflected light that is emitted from said light emission part and is reflected on the surface of the subject-sheet; and wherein said guide member is constructed to decrease an area where the subject-sheet receiving surface of said guide member contacts the subject-sheet to thereby reduce adhesion between said guide member and the subject-sheet, wherein the predetermined thickness of the air layer is $\Delta x$ satisfying the following inequality:

$$4\lambda < \Delta x,$$

where $\lambda$ is a wavelength of a light for reading the image on the subject-sheet surface with use of said light emission part.

18. An image reading unit comprising:

a guide member having a subject-sheet receiving surface which comes into contact with a subject-sheet, said guide member transmitting light at least in an image reading area and an area for illuminating an image on a subject-sheet surface;

a light emission part which illuminates the subject-sheet surface on said guide member through said guide member; and a photoelectric converter which converts the image on the subject-sheet surface, located in the image reading area on said guide member, into an image signal;

wherein said guide member is provided with one of a step and a concave such that a predetermined air layer is formed to reduce effects, on image reading, of an optical interference produced between a reflected light that is emitted from said light emission part and is reflected on a boundary between said guide member and the air, and a reflected light that is emitted from said light emission part and is reflected on the surface of the subject-sheet; and wherein said guide member is constructed to decrease an area where the subject-sheet receiving surface of said guide member contacts the subject-sheet to thereby reduce adhesion between said guide member and the subject-sheet, wherein a sheet with an uneven surface is attached to said guide member, and the surface of said sheet serves as the subject-sheet receiving surface.

19. An image reading unit comprising:

a guide member having a subject-sheet receiving surface which comes into contact with a subject-sheet, said guide member transmitting light at least in an image reading area and an area for illuminating an image on a subject-sheet surface;

a light emission part which illuminates the subject-sheet surface on said guide member through said guide member; and a photoelectric converter which converts the image on the subject-sheet surface, located in the image reading area on said guide member, into an image signal;

wherein said guide member is provided with one of a step and a concave such that a predetermined air layer is formed to reduce effects, on image reading, of an optical interference produced between a reflected light that is emitted from said light emission part and is reflected on a boundary between said guide member and the air, and a reflected light that is emitted from said light emission part and is reflected on the surface of the subject-sheet; and wherein said guide member is constructed to decrease an area where the subject-sheet receiving surface of said guide member contacts the subject-sheet to thereby reduce adhesion between said guide member and the subject-sheet, wherein a member whose surface is uneven is combined with said guide member, and the surface of said member serves as the subject-sheet receiving surface.

20. An information processing unit comprising:

an image reading unit comprising:

a guide member having a subject-sheet receiving surface which comes into contact with a subject-sheet, said guide member transmitting light at least in an image reading area and an area for illuminating an image on a subject-sheet surface;

a light emission part which illuminates the subject-sheet surface on said guide member through said guide member;

a photoelectric converter which converts the image on the subject-sheet surface, located in the image reading area on said guide member, into an image signal;

wherein said guide member is provided with one of a step and a concave such that an air layer having a predetermined thickness is formed to reduce effects, on image reading, of an optical interference produced between a reflected light that is emitted from said light emission part and is reflected on a boundary between said guide member and the air, and a reflected light that is emitted from said light emission part and is reflected on the surface of the subject-sheet; and a subject-sheet transporter including a transport roller holding the subject-sheet between said transport roller and said image reading unit, said subject-sheet transporter rotating said transport roller to transport the subject-sheet; and wherein said transport roller is offset such that an area where said image reading unit is in contact with the subject-sheet is out of the image area.

21. An information processing unit comprising:

an image reading unit comprising:
- a guide member having a subject-sheet receiving surface which comes into contact with a subject-sheet, said guide member transmitting light at least in an image reading area and an area for illuminating an image on a subject-sheet surface;
- a light emission part which illuminates the subject-sheet surface on said guide member through said guide member;
- a photoelectric converter which converts the image on the subject-sheet surface, located in the image reading area on said guide member, into an image signal;

wherein said guide member is constructed to decrease an area where the subject-sheet receiving surface of said guide member contacts the subject-sheet; and a subject-sheet transporter including a transport roller holding the subject-sheet between said transport roller and said image reading unit, said subject-sheet transporter rotating said transport roller to transport the subject-sheet, wherein said transport roller is offset such that an area where said image reading unit is in contact with the subject-sheet is out of the image area.

22. An information processing unit comprising:

an image reading unit comprising:
- a guide member having a subject-sheet receiving surface which comes into contact with a subject-sheet, said guide member transmitting light at least in an image reading area and an area for illuminating an image on a subject-sheet surface;
- a light emission part which illuminates the subject-sheet surface on said guide member through said guide member;
- a photoelectric converter which converts the image on the subject-sheet surface, located in the image reading area on said guide member, into an image signal;

wherein said guide member is provided with one of a step and a concave such that an air layer having a predetermined thickness is formed to reduce effects, on image reading, of an optical interference produced between a reflected light that is emitted from said light emission part and is reflected on a boundary between said guide member and the air, and a reflected light that is emitted from said light emission part and is reflected on the surface of the subject-sheet; and wherein said guide member is constructed to decrease an area where the subject-sheet receiving surface of said guide member contacts the subject-sheet; and a subject-sheet transporter including a transport roller holding the subject-sheet between said transport roller and said image reading unit, said subject-sheet transporter rotating said transport roller to transport the subject-sheet, wherein said transport roller is offset such that an area where said image reading unit is in contact with the subject-sheet is out of the image area.

* * * * *